(12) United States Patent
Hu et al.

(10) Patent No.: US 11,183,913 B2
(45) Date of Patent: Nov. 23, 2021

(54) PERMANENT MAGNET MOTOR

(71) Applicant: Gree Green Refrigeration Technology Center Co., Ltd. of Zhuhai, Guangdong (CN)

(72) Inventors: Yusheng Hu, Guangdong (CN); Bin Chen, Guangdong (CN); Quanfeng Li, Guangdong (CN); Wenjiao Sun, Guangdong (CN); Bo Zhou, Guangdong (CN)

(73) Assignee: Gree Green Refrigeration Technology Center Co., Ltd. of Zhuhai, Guangdong (CN)

( * ) Notice: Subject to any disclaimer, the term of this patent is extended or adjusted under 35 U.S.C. 154(b) by 121 days.

(21) Appl. No.: 16/616,909

(22) PCT Filed: Dec. 22, 2017

(86) PCT No.: PCT/CN2017/117864
§ 371 (c)(1),
(2) Date: Nov. 25, 2019

(87) PCT Pub. No.: WO2018/233253
PCT Pub. Date: Dec. 27, 2018

(65) Prior Publication Data
US 2021/0175786 A1    Jun. 10, 2021

(30) Foreign Application Priority Data

Jun. 21, 2017   (CN) .......................... 201710476485.5

(51) Int. Cl.
*H02K 1/27*   (2006.01)
*H02K 29/03*   (2006.01)
(Continued)

(52) U.S. Cl.
CPC ............... *H02K 29/03* (2013.01); *H02K 1/02* (2013.01); *H02K 1/276* (2013.01); *H02K 21/024* (2013.01);
(Continued)

(58) Field of Classification Search
CPC .......... H02K 29/03; H02K 1/02; H02K 1/276; H02K 21/024; H02K 2201/03; H02K 2213/03; H02K 1/2773; H02K 21/14
See application file for complete search history.

(56) References Cited

U.S. PATENT DOCUMENTS

2007/0126305 A1\*   6/2007   Okuma ................... H02K 29/03
                                                                            310/156.53
2012/0091845 A1    4/2012   Takemoto et al.
(Continued)

FOREIGN PATENT DOCUMENTS

| CN | 102244427 A |   | 11/2011 |
|---|---|---|---|
| JP | 2012151970 A | * | 8/2012 |
| JP | 2012151970 A |   | 8/2012 |

OTHER PUBLICATIONS

Machine Translation, UTSUMI, JP-2012151970-A, Aug. 2012. (Year: 2012).*

(Continued)

*Primary Examiner* — Thomas Truong
(74) *Attorney, Agent, or Firm* — Brandon V. Zuniga; James R. Gourley; Carstens & Cahoon, LLP

(57) ABSTRACT

Provided is a permanent magnet motor, comprising a rotor component and a stator component. The rotor component comprises alternating poles and permanent magnet poles alternately arranged in a circumferential direction. The stator component comprises stator teeth portions arranged and spaced apart in a circumferential direction on an inner circumferential side of the stator component. A first air gap is formed between an inner circumferential side of the stator (Continued)

teeth portion and an outer circumferential side of the permanent magnet pole. A second air gap is formed between the inner circumferential side of the stator teeth portion and an outer circumferential side of the alternating pole. An average thickness of the first air gap is $\delta 1$; an average thickness of the second air gap is $\delta 2$, wherein $0.4 \leq \delta 2/\delta 1 \leq 0.9$.

18 Claims, 14 Drawing Sheets

(51) Int. Cl.
    *H02K 1/02*     (2006.01)
    *H02K 21/02*     (2006.01)
(52) U.S. Cl.
    CPC ..... *H02K 2201/03* (2013.01); *H02K 2213/03* (2013.01)

(56) References Cited

U.S. PATENT DOCUMENTS

| | | |
|---|---|---|
| 2014/0117792 A1 | 5/2014 | Naitou |
| 2014/0159534 A1* | 6/2014 | Taniguchi ............ H02K 1/2746 310/156.53 |
| 2014/0265706 A1* | 9/2014 | Yamada ................... H02K 1/24 310/156.43 |

OTHER PUBLICATIONS

Full application text English translation of CN102244427A published on Nov. 16, 2011.
Full application text English translation of JP2012151970A published on Aug. 9, 2012.
Extended European Search Report for European Application No. 17914409.2 dated Feb. 20, 2021 (9 pages).

* cited by examiner though the conventional permanent magnet motor, such as an 8-pole permanent magnet motor, has eight sets of permanent magnets arranged in a rotating direction of the rotor around the center of the rotor, and adjacent permanent magnets have different magnetization directions. The magnetic line from the N pole of one permanent magnet passes through the stator core to the S pole of an adjacent permanent magnet. The magnetic line passes through at least two sets of permanent magnets with different magnetization directions in a loop, therefore the permanent magnets are not sufficiently utilized, which causes the cost of the motor to be higher.

PERMANENT MAGNET MOTOR

CROSS-REFERENCE TO RELATED APPLICATIONS

This application is a US 371 application from PCT/CN2017/117864 filed Dec. 22, 2017, published as WO 2018/233253 A1 on Dec. 27, 2018, which claims priority to CN Application 201710476485.5 filed Jun. 21, 2017, the technical disclosures of which applications and publications are hereby incorporated by reference in their entirety.

TECHNICAL FIELD

The present invention relates to a field of motor equipment technology, and specifically relates to a permanent magnet motor.

BACKGROUND

The conventional permanent magnet motor, such as an 8-pole permanent magnet motor, has eight sets of permanent magnets arranged in a rotating direction of the rotor around the center of the rotor, and adjacent permanent magnets have different magnetization directions. The magnetic line from the N pole of one permanent magnet passes through the stator core to the S pole of an adjacent permanent magnet. The magnetic line passes through at least two sets of permanent magnets with different magnetization directions in a loop, therefore the permanent magnets are not sufficiently utilized, which causes the cost of the motor to be higher.

In the prior art, a consequent-pole permanent magnet motor is provided. Still taking an 8-pole motor as an example, only four sets of permanent magnets are provided in the 8-pole motor, and the adjacent permanent magnets have the same length in the magnetization direction. The magnetic pole provided with a permanent magnet mounting slot is a permanent magnet pole, and the soft magnetic material between two permanent magnet mounting slots is magnetized by the permanent magnets, to have a polarity opposite to the polarity of the permanent magnet pole, thus this kind of motor is described as an alternating pole permanent magnet motor.

As to the conventional alternating pole permanent magnet motor, two adjacent magnetic poles are made of different materials and have different structures, and if the consequent-pole permanent magnet motor is designed in accordance with the conventional permanent magnet motor, then the air gaps, which are respectively formed between the surface of each of the adjacent magnet poles and the surface of a corresponding teeth boot of the stator core, are identical, therefore there will be a problem of asymmetry of the wave form of the back-electromotive force (BEMF).

SUMMARY

In view of this, the technical problem to be solved by the present invention is to provide a permanent magnet motor, which can reduce the asymmetry of the magnetic flux density amplitudes of the air gaps corresponding to the permanent magnet pole and the alternating pole and reduce the torque ripples.

In order to solve the above-mentioned problem, the present invention provides a permanent magnet motor including a permanent magnet motor includes a rotor component and a stator component, the rotor component includes alternating poles and permanent magnet poles alternately arranged in a circumferential direction; the stator component includes stator teeth portions arranged on an inner circumferential side of the stator component and spaced apart in a circumferential direction; a first air gap is formed between an inner circumferential surface of the stator teeth portion and an outer circumferential surface of a corresponding permanent magnet pole; a second air gap is formed between the inner circumferential surface of the stator teeth portion and an outer circumferential surface of a corresponding alternating pole; an average thickness of the first air gap is δ1; and an average thickness of the second air gap is δ2, wherein $0.4 \leq \delta2/\delta1 \leq 0.9$.

The rotor component comprises a rotor core; a plurality of mounting slots are arranged on the rotor core and spaced apart in a circumferential direction; permanent magnets are arranged in the mounting slots; polarities of the permanent magnets facing an outer periphery of the rotor core are same; adjacent mounting slots are spaced apart by soft magnetic material; first air slot are respectively arranged between two ends of the mounting slot and adjacent soft magnetic material thereto in a circumferential direction; two second air slots are arranged at one side of the mounting slot, which is adjacent to the outer periphery of the rotor core; one of the second air slots is arranged at a first end of the mounting slot, and another second air slot is arranged at a second end of the mounting slot; and the two second air slots extend in opposite directions.

In some embodiments, a thickness of a permanent magnet of the permanent magnet poles is t, wherein $t/(\delta2+\delta1) \geq 1.5$.

In some embodiments, an outer circumference of the permanent magnet pole has a first arc; an outer circumference of the alternating poles has a second arc; the first arc and the second arc are concentric; a radius of curvature of the first arc is r1, and a radius of curvature of the second arc is r2, wherein r1<r2.

In some embodiments, an outer circumference of the permanent magnet pole is a first arc; an outer circumference of the alternating pole is a second arc; the first arc and/or the second arc is eccentric relative to a center of a rotary axis of the rotor component; the first arc and the second arc are not concentric; and a thickness of the first air gap and/or a thickness of the second air gap is uneven.

In some embodiments, an outer circumference of the permanent magnet pole is step-shaped; a height of the step is reduced from a center of the outer circumference of the permanent magnet pole to both sides of the outer circumference of the permanent magnet pole; and/or an outer circumference of the alternating poles is step-shaped, and a center of the outer circumference of the alternating pole to both sides of the outer circumference of the alternating pole.

In some embodiments, a top of the step is arc-shaped.

In some embodiments a tangent of an inner circle of a stator teeth portion is formed at an intersection point of an extension line of a side surface of each alternating pole and the inner circle of the stator teeth portion, and an angle α is formed between the tangent and the side surface of each alternating pole, and 55°<α<90°.

In some embodiments, at least one segment of the inner circumferential surface of the stator teeth portion, which is adjacent to the rotor component, is an arc having a same center.

In some embodiments, the rotor component includes a rotor core and permanent magnets embedded in the rotor core; and each of the permanent magnets is bar-shaped or V-shaped.

In some embodiments, the first air slot extends inwards from the outer periphery of the rotor core; or the first air slots is disposed at an inner side of the outer periphery of the rotor core.

In some embodiments, the second air slot extends inward from the outer periphery of the rotor core; the second air slot is in communication with the first air slots and is spaced apart from the mounting slot; or the second air slot is located at an inner side of the outer periphery of the rotor core and is in communication with an end of the mounting slot; or the second air slot is located at an inner side of the outer periphery of the rotor core and is spaced apart from the mounting slot.

In some embodiments, the alternating pole is formed by soft magnetic material between two adjacent mounting slots; a minimum angle b is formed by lines which are respectively connected between the two first air slots disposed at two circumferential ends of one of the alternating poles and a center of the rotor core; and a minimum angle e is formed by lines which are respectively connected between the two second air slots corresponding to one mounting slot and the center of the rotor core, wherein $0.8 \leq b/e \leq 1.1$.

In some embodiments, a thickness of the permanent magnet in a magnetization direction is t, and a depth d of the first air slot is a radial distance from a position of the first air slot, which is nearest to a center of a rotary axis of the rotor, to the outer periphery of the rotor core, wherein $0.5t \leq d \leq 2t$.

In some embodiments, the second air slot has a width w1 in a radial direction; and a distance between an edge of the second air slot, which is adjacent to the mounting slot, and the outer periphery of the rotor core is w2, wherein $0.9 \leq w1/w2 \leq 1.1$.

In some embodiments, an angle c is formed by lines which are respectively connected between two outermost ends of each of the permanent magnets in one the mounting slot and the center of the rotor, wherein, the two outermost ends of the permanent magnet are respectively adjacent to one side of the corresponding second air slots; and $0.7 \leq e/c \leq 1$.

In some embodiments, the second air slot is filled with non-magnetic material.

In some embodiments, more than one permanent magnet is arranged in each mounting slot.

In some embodiments, the permanent magnet contains rare earth elements.

The permanent magnet motor provided by the present invention includes a permanent magnet motor includes a rotor component and a stator component, the rotor component includes alternating poles and permanent magnet poles alternately arranged in a circumferential direction; the stator component includes stator teeth portions arranged on an inner circumferential side of the stator component and spaced apart in a circumferential direction; a first air gap is formed between an inner circumferential surface of the stator teeth portion and an outer circumferential surface of a corresponding permanent magnet pole; a second air gap is formed between the inner circumferential surface of the stator teeth portion and an outer circumferential surface of a corresponding alternating pole; an average thickness of the first air gap is $\delta 1$; and an average thickness of the second air gap is $\delta 2$, wherein $0.4 \leq \delta 2/\delta 1 \leq 0.9$. In the permanent magnet motor, a thin air gap is formed between each corresponding alternating pole and the inner circumferential surface of the stator teeth portion, and the thickness of the air gap between the surface of the permanent magnet pole and the surface of stator teeth boot always satisfies $\delta 1 > \delta 2$. The magnetic lines describing the magnetic field generated by the permanent magnets are closed in the whole magnetic loop, and may select a path with smaller magnetic resistance to pass through. Whereas the main magnetic resistance in the whole magnetic loop is derived from the air gaps between the stator and the rotor. When the air gap between the alternating pole and the stator teeth portions is smaller, the magnetic resistance of the whole magnetic loop may become smaller, and thereby the magnetic flux density of the whole loop may become stronger. Especially for the alternating pole, due to the smaller magnetic resistance thereof, more magnetic lines select to pass through the magnet poles, thereby reducing the magnetic flux passing through the air gap corresponding the outer circumferential surface of the alternating pole, forming more magnetic flux in the alternating pole, reducing the asymmetry of the magnetic flux density amplitudes of air gaps corresponding to the permanent magnet pole and the alternating pole effectively, and reducing the torque ripples.

Figure 1:
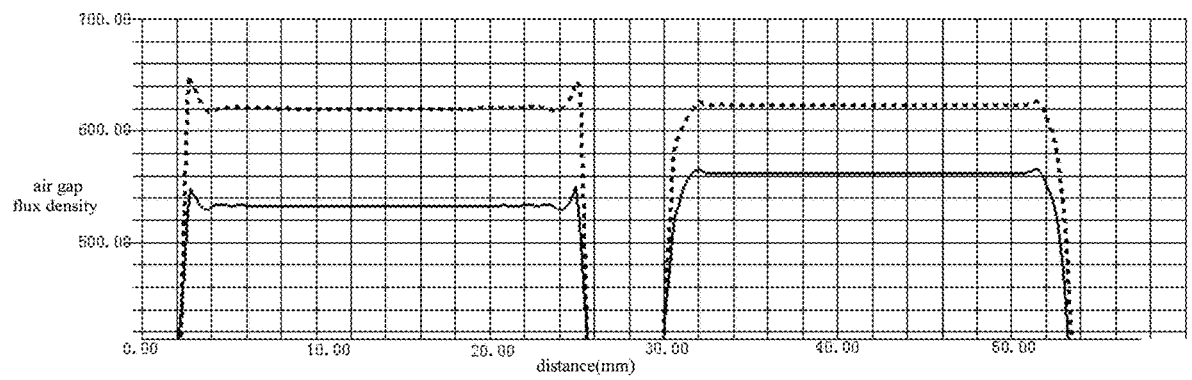
FIG. 1 is a comparison diagram illustrating wave forms of the air gap magnetic flux densities corresponding to a pair of magnetic poles of a conventional consequent-pole permanent magnet motor and those of a consequent-pole permanent magnet motor according to an embodiment of the present invention.

The reference numerals are denoted by:

1 rotor component; 2 stator component; 3 permanent magnet pole; 4 alternating pole; 5 stator teeth portion;

6 first air gap; 7 second air gap; 8 permanent magnet; 9 rotor core; 10 mounting slot; 11 first air slot; 12 second air slot.

DETAILED DESCRIPTION OF EMBODIMENTS

With reference to FIGS. 1 to 18, according to an embodiment of the present invention, a permanent magnet motor includes a rotor component 1 and a stator component 2. The rotor component 1 includes alternating poles 4 and permanent magnet poles 3 alternately arranged in a circumferential direction. The stator component 2 includes stator teeth portions 5 arranged and spaced apart in a circumferential direction on an inner circumferential side of the stator component. A first air gap 6 is formed between an inner circumferential surface of the stator teeth portion 5 and an outer circumferential surface of a corresponding permanent magnet pole 3. The inner circumferential surface of the stator teeth portion 5 is adjacent to the rotor component 1. A second air gap 7 is formed between the inner circumferential surface of the stator teeth portion 5 and an outer circumferential surface of a corresponding alternating pole 4. The average thickness of the first air gap 6 is $\delta1$, and the average thickness of the second air gap 7 is $\delta2$, where $0.4 \leq \delta2/\delta1 \leq 0.9$.

The rotor component 1 includes a rotor core which is formed by laminating soft magnetic material sheets. The rotor core is provided with permanent magnet mounting slots, and permanent magnets 8 are arranged in the mounting slots. All of polarities of permanent magnets 8 facing the outer periphery of the rotor are identical, thereby forming a plurality of permanent magnet poles on the rotor. The adjacent permanent magnet poles are spaced apart by soft magnetic material, and the soft magnetic material between the adjacent permanent magnet poles forms an alternating pole, which has opposite polarity to the adjacent permanent magnet poles due to magnetization of the adjacent permanent magnet poles.

The stator component 2 includes a stator with a ring-like shape. The stator is formed by laminating soft magnetic material sheets. The stator teeth portions 5 are arranged in the rotating direction in the ring. The rotor core is mounted in a circular cavity formed by all stator teeth portions 5, and can rotate without contacting with the stator teeth portions 5. An air gap with a certain thickness is formed between an end portion of each stator teeth portion 5 and the surface of the rotor. The end portion of each stator teeth portion 5 is adjacent to the surface of the rotor. FIG. 1 shows the wave forms of the air gap magnetic flux densities corresponding to a pair of magnetic poles. The curves shown in the left half of the figure illustrate the wave forms of the air gap magnetic flux densities corresponding to the alternating pole; the curves shown in the right half of the figure illustrates the wave forms of the air gap magnetic flux densities corresponding to the permanent magnet pole; and the flat portions of the curves illustrate the amplitudes of corresponding air gap magnetic flux densities. The solid lines illustrate the wave forms of the air gap magnetic flux densities of a conventional consequent-pole permanent magnet motor, and the dotted lines illustrate the wave forms of the air gap magnetic flux densities corresponding to a pair of magnetic poles according to a technical solution of the present invention. As shown in the figure, in the prior art, the air gap magnetic flux density corresponding to the alternating pole is obviously smaller than the air gap magnetic flux density corresponding to the permanent magnet pole, and there is a serious asymmetry of the amplitudes of the air gap magnetic flux densities. Therefore large torque ripples will rise during the operation of the motor.

After the technical solution of the present disclosure is utilized, in the permanent magnet motor, a thin air gap is formed between each corresponding alternating pole and the inner circumferential surface of the stator teeth portion, and the thickness of the air gap between the surface of the permanent magnet pole and the surface of stator teeth boot always satisfies $\delta1 > \delta2$. The magnetic lines describing the magnetic field generated by the permanent magnets are closed in the whole magnetic loop, and may select a path with smaller magnetic resistance to pass through. Whereas the main magnetic resistance in the whole magnetic loop is derived from the air gaps between the stator and the rotor. When the air gap between the alternating pole and the stator teeth portions is smaller, the magnetic resistance of the whole magnetic loop may become smaller, and thereby the magnetic flux density of the whole loop may become stronger. Especially for the alternating pole, due to the smaller magnetic resistance thereof, more magnetic lines select to pass through the alternating pole, thereby reducing the magnetic flux passing through the air gap corresponding the outer circumferential surface of the alternating pole, forming more magnetic flux in the alternating pole, reducing the asymmetry of the magnetic flux density amplitudes of air gaps corresponding to the permanent magnet pole and the alternating pole effectively, and reducing the torque ripples.

In some embodiments, a thickness of the permanent magnet of the permanent magnet pole 3 is t, where $t/(\delta2+\delta1) \geq 1.5$. This configuration can ensure that the permanent magnet has a suitable working point, thereby providing sufficient magnetic flux and having certain anti-demagnetization capability.

In some embodiments, an angle $\alpha$ is formed between a side surface of the alternating pole 4 and an inner circumferential surface of a corresponding stator teeth portion 5, which faces the rotor component 1, where $55° < \alpha < 90°$.

Figure 2:
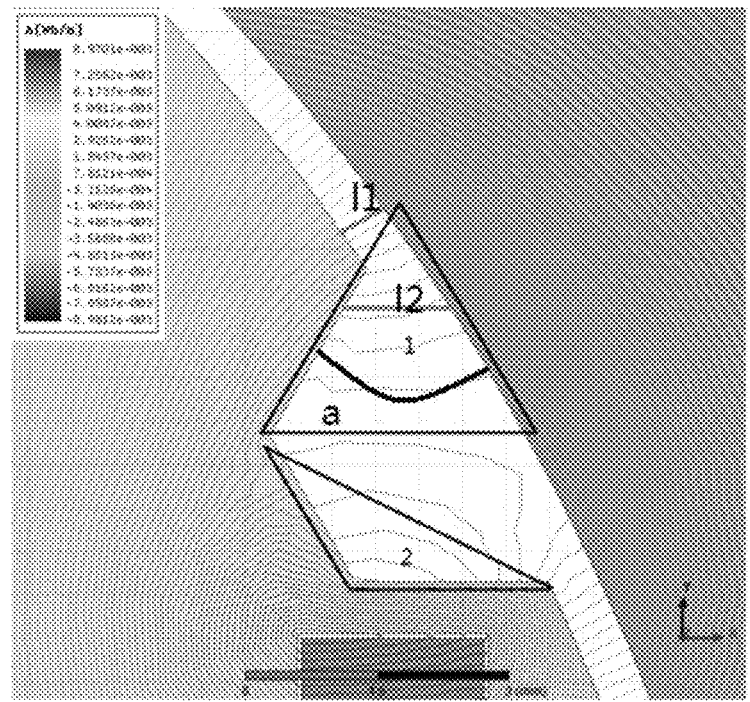
FIG. 2 is a diagram illustrating a magnetic flux leakage distribution near an alternating pole of a consequent-pole permanent magnet motor of the present invention.

With reference to FIG. 2, the magnetic flux leakage near the alternating pole can be substantially divided into two portions, as shown in triangles 1 and 2 in FIG. 2. A portion of the magnetic lines from one side of the alternating pole directly pass through the air gap to reach the stator, and belongs to the magnetic flux leakage of the alternating pole. As shown in the triangle 1, the magnetic flux leakage of the alternating pole generally accounts for 5% to 10% of the total magnetic flux of the alternating pole. Another portion is the short-path of the magnetic lines between the bottom of a notch between magnetic poles and a side of the permanent magnetic pole, and belongs to the magnetic flux leakage of the permanent magnet pole, as shown in the triangle 2. In order to make the air gap magnetic flux density corresponding to the alternating pole and the air gap magnetic flux density corresponding to the permanent magnet pole more symmetrical, only the first portion such as the magnetic flux leakage shown in the triangle 1 is improved herein. The amount of this portion of magnetic flux leakage is mainly determined by the value of l1/l2, where l1 is a thickness of the air gap between the alternating pole and the stator, and l2 is a thickness of the air gap, which is adjacent to an intersecting point of outer circumferential surface and side surface of the alternating pole and disposed between the side surface of the alternating pole and the stator. The thickness l2 is mainly determined by an angle a formed between the side surface of the alternating pole and an inner circumferential surface of the stator teeth portion 5. The larger the angle a is, the smaller this portion of magnetic flux leakage is. However, when a>90°, the width of the alternating pole is obviously reduced, which is detrimental to the output of the motor. Thus the optimum range of the angle a is between 55° and 90°. When determining the angle a, a tangent of the inner circle of the stator teeth portion 5 is formed at the intersection point of an extension line of the side surface of the alternating pole and the inner circle of the stator teeth portion 5, and the angle a is formed between the tangent line and the side surface of the alternating pole.

In some embodiments, at least one segment of the inner circumferential surface of the stator teeth portion 5, which is adjacent to the rotor component 1, is an arc having the same center, such that the amplitude of the magnetic flux density fundamental wave can be maximized, and that the load capacity of the motor can be ensured.

In some embodiments, the rotor component 1 includes the rotor core and the permanent magnets 8 embedded in the rotor core. The permanent magnet 8 is bar-shaped or V-shaped. When the permanent magnet 8 is V-shaped, greater space can be provided for the installation of magnetic steel and improve the anti-demagnetization capability of the permanent magnet 8.

Figure 3:
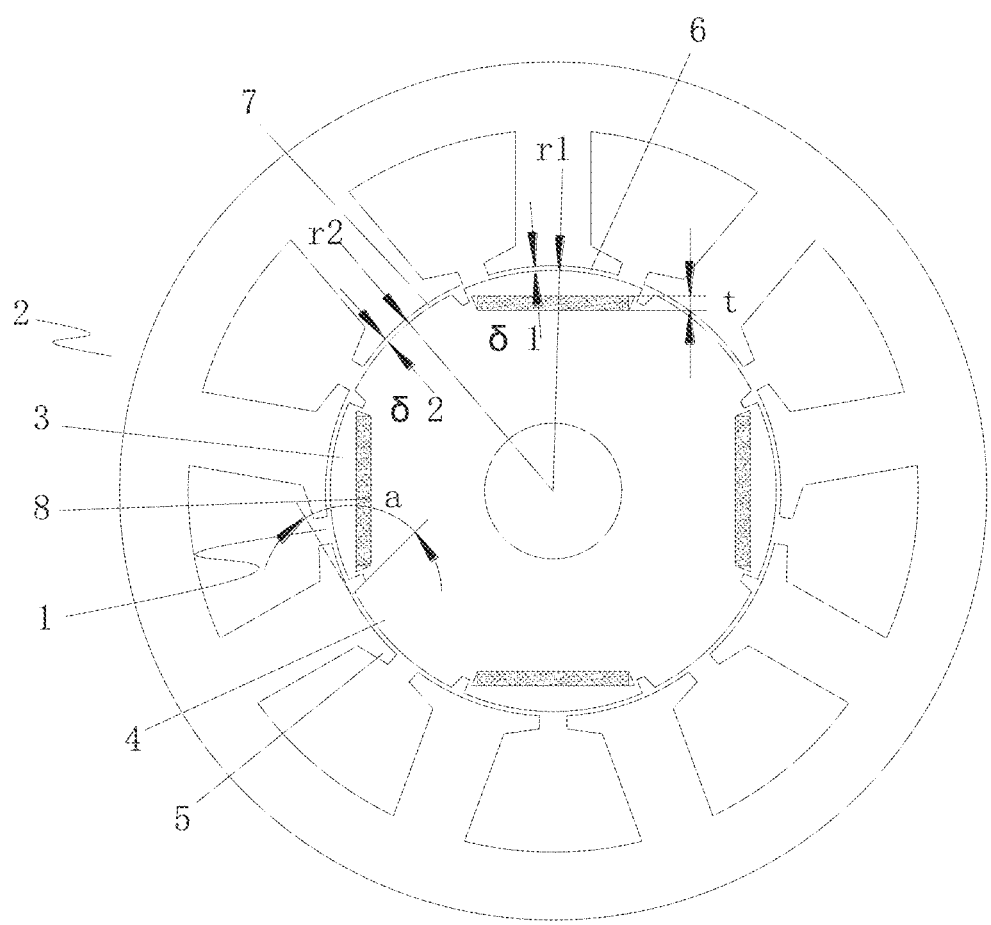
FIG. 3 is a structural diagram of a first embodiment of the permanent magnet motor of the present invention.

In some embodiments, with reference to FIG. 3, it relates to a permanent magnet motor according to a first embodiment of the present invention. In the present embodiment, the outer circumference of the permanent magnet pole 3 has a first arc, the outer circumference of the alternating pole 4 has a second arc, and the first arc and the second arc are concentric. A radius of curvature of the first arc is r1, and a radius of curvature of the second arc is r2, where r1<r2. With reference to FIG. 1, compared with the prior art, in the solution of the present embodiment, although both amplitudes shown in the flat portions of the curves corresponding to the alternating pole and the permanent magnet pole are respectively increased due to r1<r2, the air gap magnetic flux density corresponding to the alternating pole is increased more, and the amplitudes shown in the flat portions of the curves both reach the same level, thereby obviously alleviating the problem of asymmetry of the magnetic flux density amplitudes caused by the fact that the air gap magnetic flux density corresponding to the alternating pole is smaller than the air gap magnetic flux density corresponding to the permanent magnet pole, and reducing the torque ripples generated during the operation of the motor.

Figure 7:
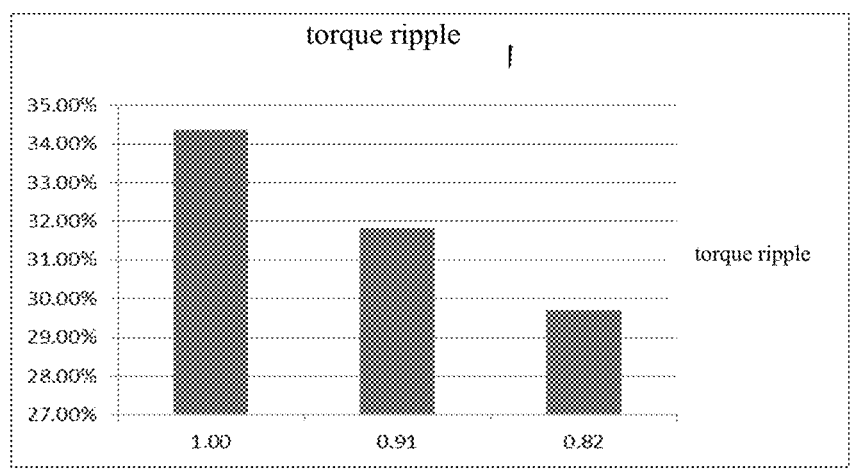
FIG. 7 is a diagram illustrating the torque ripples varying with $\delta 2/\delta 1$.

With reference to FIG. 7, FIG. 7 illustrates the variation of the torque ripples under the condition that r1 keeps unchanged and that only r2 is varied, and the horizontal coordinate of the figure represents the variation of the air gap thickness δ2, or represents the ratio of δ2/δ1 when δ1 is unchanged. It can be seen that the torque ripples are reduced significantly as δ2 becomes smaller. Study proves that if the ratio is too small, the torque ripples may increase instead, because the amplitude of the magnetic flux density of the air gap corresponding to the alternating pole has exceeded the amplitude of magnetic flux density of the air gap corresponding to the permanent magnet pole. Therefore, there may be an optimum value among the ratio of δ2/δ1 for each different motor. In the present embodiment, the ratio satisfies 0.4≤δ2/δ1≤0.9.

Figure 4:
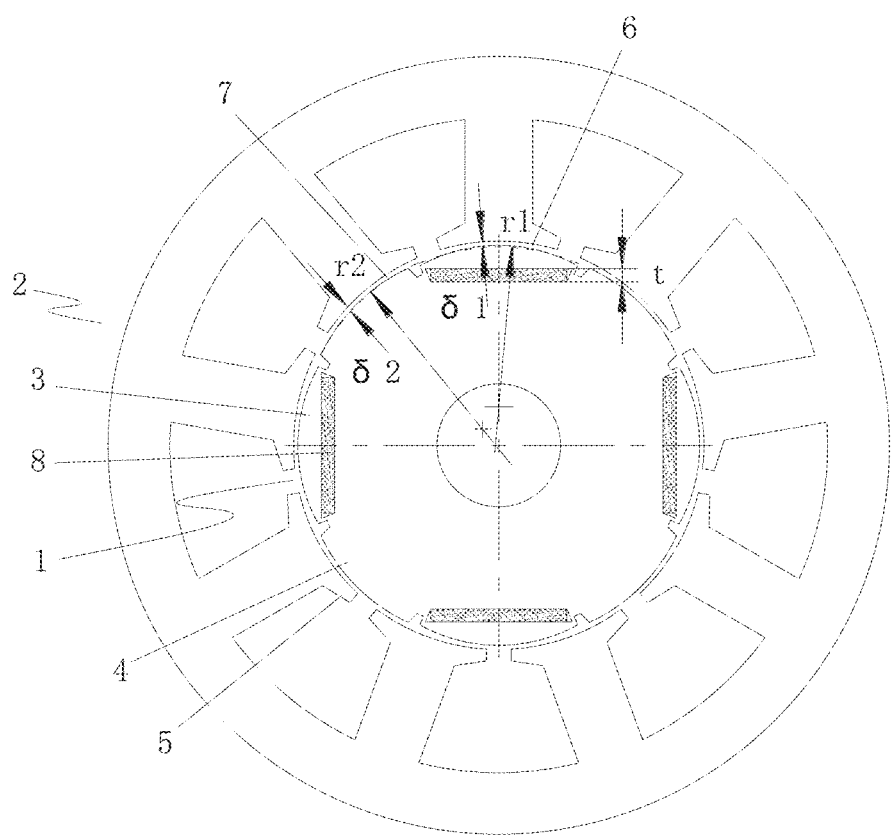
FIG. 4 is a structural diagram of a second embodiment of the permanent magnet motor of the present invention.

With reference to FIG. 4, according to a second embodiment of the permanent motor of the present invention, the outer circumference of the permanent magnet pole 3 is a first arc, and the outer circumference of the alternating pole 4 is a second arc. At least one of the first arc and the second arc are arranged eccentrically relative to the center of the rotary axis of the rotor component 1, and the first arc and the second arc are not concentric. The thickness of the first air gap 6 is uneven, and/or the thickness of the second air gap 7 is uneven. The first arc and/or the second arc are arranged eccentrically relative to the center of the rotary axis of the rotor component 1, which makes the thickness of the first air gap 6 uneven and/or the thickness of the second air gap 7 uneven, thereby reducing the magnetic field distortion at the junction of the alternating pole and the air gap.

In the present embodiment, the center line of each of the magnetic poles of the permanent magnet motor is a d-axis, and the axis which forms an intersection angle of an electrical angle of 90° with the d-axis is a q-axis. A notch is disposed at the outer edge of the rotor and adjacent to the alternating position between the alternating pole and the permanent magnet pole. The depth of the notch is generally larger due to the particularity of the consequent-pole permanent magnet motor. Since the difference between the magnetic conductivity of the air and the magnetic conductivity of the soft magnetic material is large, the magnetic flux density in the alternating pole adjacent to the alternating position may be quite different, which causes distortion and increases teeth slot torque, whereas the structure of the present embodiment can improve such conditions.

Since the outer circumferences of the permanent magnet pole and the alternating pole are arcs with a certain eccentricity, the thickness of the air gap gradually increases from the center of the magnetic pole to the boundary of the magnetic pole, so that the thickness of the air gap at the boundary of the magnet pole, namely at the q-axis, will be thicker. Although the notch causes the thickness of the air gap near the q-axis to suddenly increase, the increment will be alleviated due to the eccentricity. Meanwhile, δ1>δ2 is ensured by respective radius of curvature of the outer circumference of the corresponding magnetic pole, thus not only the consistency of the amplitudes of the magnetic flux densities of adjacent magnetic poles can be ensured, but also the sharp change of the magnetic flux density of the air gap at two sides of the magnetic pole can be alleviated, thereby reducing the harmonic content as well as the teeth slot torque.

Figure 5:
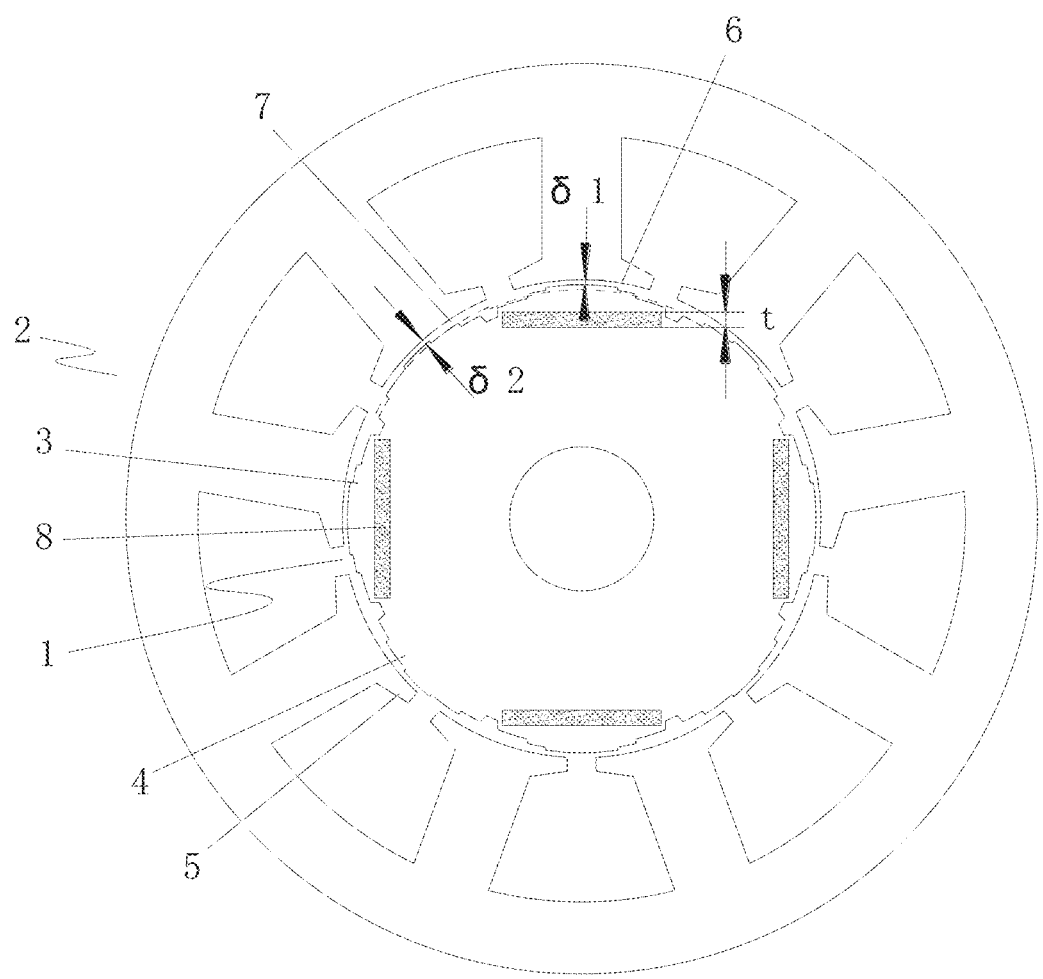
FIG. 5 is a structural diagram of a third embodiment of the permanent magnet motor of the present invention.
Figure 6:
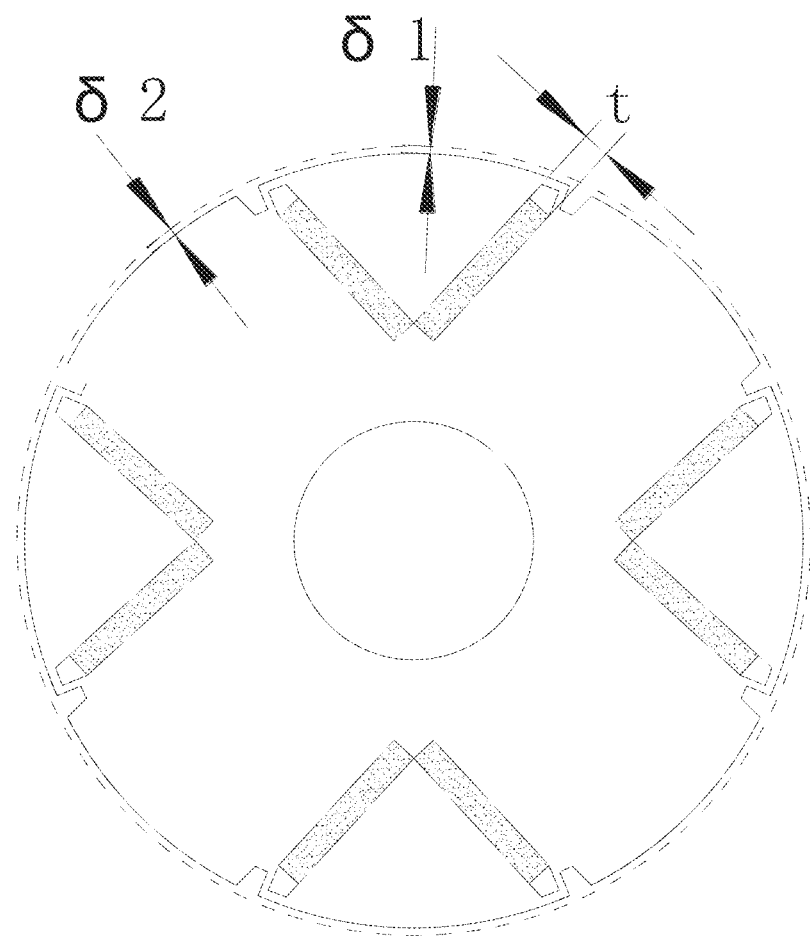
FIG. 6 is a structural diagram illustrating another structure of the rotor component of the first embodiment of the permanent magnet motor of the present invention.

With reference to FIG. 5, according to a third embodiment of the permanent magnet motor of the present invention, the outer circumference of the permanent magnet pole 3 is step-shaped, and/or the outer circumference of the alternating pole 4 is step-shaped. Height of the step is reduced from the center of the outer circumference of the permanent magnet pole 3 and/or the alternating poles 4 to both sides of the outer circumference. By utilizing the solution of the present embodiment, the distribution of the magnetic field of the air gap corresponding to the magnetic pole can be improved more flexibly by adjusting the length and the thickness of the steps on the outer circumferential surface of the rotor, such that the thicker air gap is transferred to the thinner air gap more uniformly, thereby further reducing the torque ripples.

In some embodiments, the top of the step is an arc. By designing the top of the step toward the stator teeth portion 5 as an arc, the top shape of the step can be more matched with the shape of the inner circumferential surface of the stator teeth portion 5, thereby decreasing a sharp change of air gap thickness and reducing the torque ripples.

The above-mentioned several kinds of outer circumference structures of the rotor component 1 can be combined. For example, the outer circumferential surface of the alternating pole can have a step structure, and the outer circumferential surface of the permanent magnet pole can have an arc structure; or the outer circumferential surface of the permanent magnet pole has a step structure, and the outer circumferential surface of the alternating pole has an arc structure; or the outer circumferential surface of the alternating pole has a step structure, and the outer circumferential surface of the permanent magnet pole has an arc structure, and the circle center of the arc of the outer circumference of the permanent magnet pole is arranged eccentrically relative to the center of the rotor core, etc.

With reference to FIGS. 8 to 18, in the present embodiment, the rotor component 1 includes a rotor core 9, and a plurality of mounting slots 10 are arranged on the rotor core 9 and spaced apart in a circumferential direction. Permanent magnets 8 are arranged in the mounting slots 10, and the polarities of the permanent magnets 8 facing the outer periphery of the rotor are same. The adjacent mounting slots 10 are spaced apart by soft magnetic material. First air slots 11 are respectively arranged between two ends of the mounting slot 10 and the adjacent soft magnetic material thereto in a circumferential direction, and two second air slots 12 are arranged at one side of the mounting slot 10, which is adjacent to the outer periphery of the rotor core 9. One second air slot 12 is arranged at a first end of the mounting slot 10, and the other second air slot 12 is arranged at a second end of the mounting slot 10, and the two second air slots are extended in opposite directions.

The two second air slots 12 are arranged at both ends of the mounting slot of the permanent magnet, and disposed at the side of the mounting slot, which is adjacent to the outer periphery of the rotor core 9, therefore, on one hand, the second air slots 12 change the magnetic flux surface width of the air gap corresponding to the permanent magnet pole formed by the permanent magnet 8 in the mounting slot 10. On the other hand, the second air slots are arranged at both ends of the permanent magnet pole, and the magnetic flux surface width of the air gap corresponding to the alternating pole and the magnetic flux surface width of the air gap corresponding to the permanent magnet pole can be adjusted and perfectly matched, which can not only improve the output torque and the performance of the motor, but also improve the asymmetry of the magnetic flux density wave forms of adjacent magnetic poles, thereby reducing the torque ripples, increasing the output of the motor, and improving the performance of the motor.

In the present embodiment, the alternating pole 4 is formed by the soft magnetic material between two adjacent mounting slots 10. A minimum angle b is formed by lines respectively connected between the two first air slots 11 and the center of the rotor core 9, where the two first air slots 11 are disposed at two circumferential ends of one alternating pole 4. The minimum angle e is formed by lines respectively connected between the two second air slots 12 and the center of the rotor core 9, where the two second air slots 12 correspond to one mounting slot 10, wherein 0.8≤b/e≤1.1. When the range of b/e meets the above requirements, the torque of the rotor core 9 remains high, meanwhile, the electromagnetic torque ripples of the permanent magnet motor is extremely small, which can reduce the noise generated during the operation of the motor and improve the output power of the motor.

Figure 13:
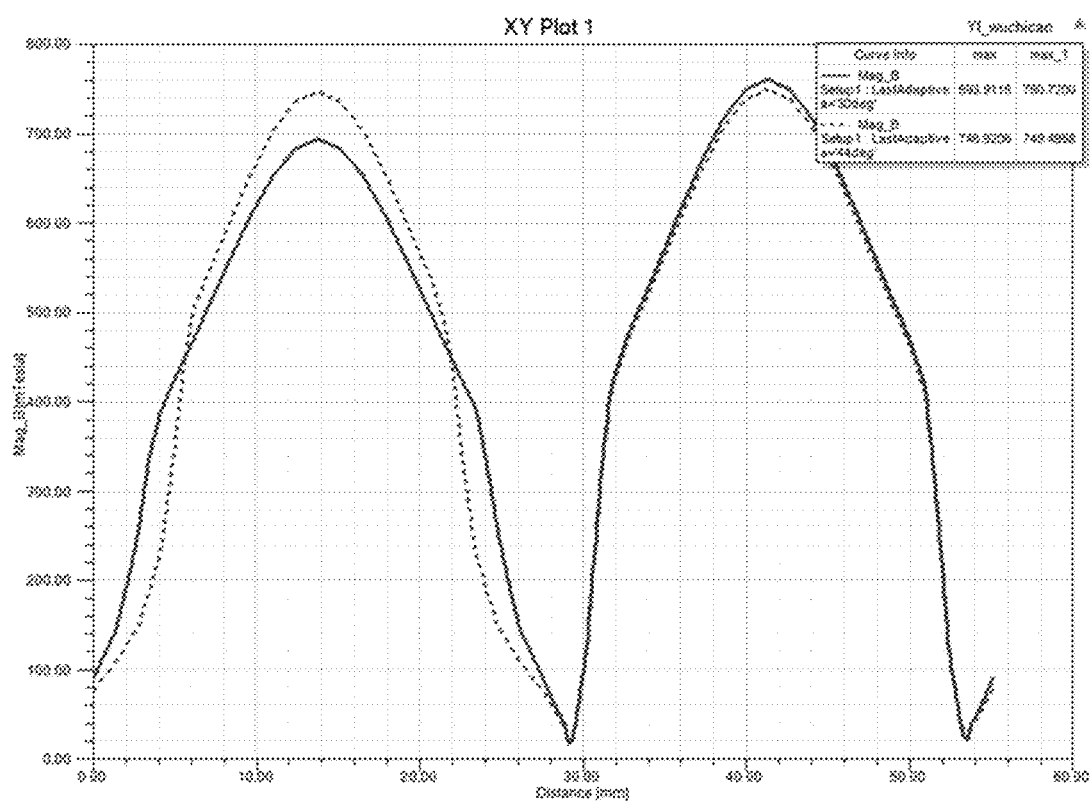
FIG. 13 is a comparison diagram illustrating wave forms of the air gap magnetic flux densities corresponding to a pair of magnetic poles in the art and those of an embodiment of the present invention.
Figure 14:
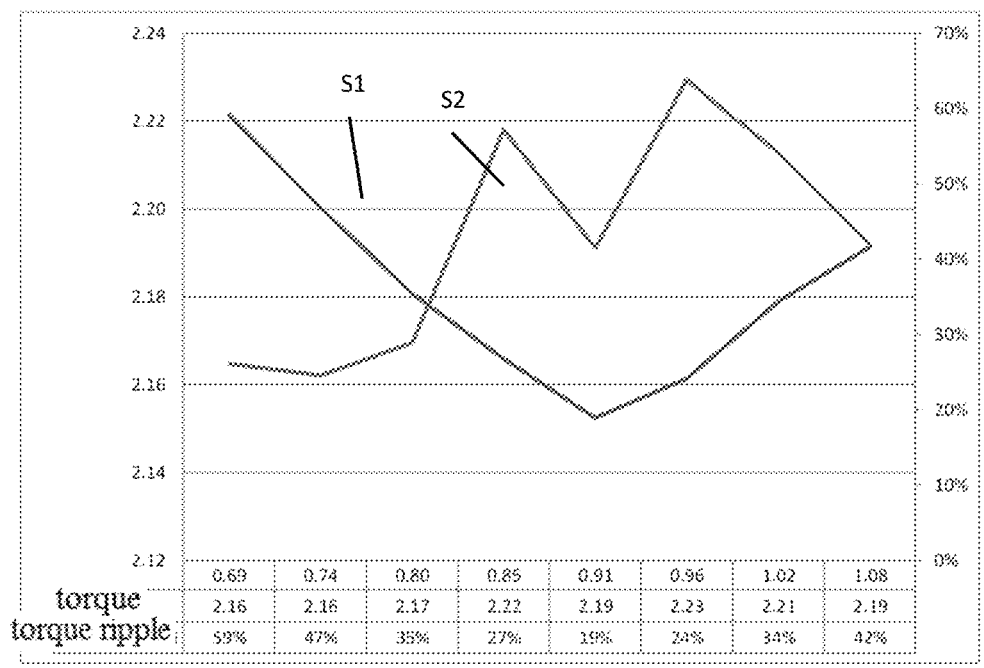
FIG. 14 is a curve graph illustrating the electromagnetic torques varying with e/b and the torque ripples varying with e/b.

Since the materials and structures of adjacent magnetic poles are both different, if the permanent magnet motor is designed based on conventional technology, that is, the length of the air gap corresponding to the alternating pole is the same as the length of the air gap corresponding to the permanent magnet pole, then there will be a problem of the asymmetry of the wave form of the back-electromotive force. The solid line in FIG. 13 illustrates a waveform of the magnetic flux density of the air gap corresponding to a pair of magnetic poles in the prior art. The amplitudes of the solid line are severely asymmetric, and larger torque ripples are generated during the operation of the motor. However, in the present embodiment, the slots and notches are provided, such that the symmetry of the air gap magnetic flux densities corresponding to the adjacent magnetic poles can be effectively adjusted, thereby reducing the torque ripples, and improving the electromagnetic torque of the motor, as shown by the broken line in FIG. 13. FIG. 14 is a curve graph illustrating the variation of the electromagnetic torques varying with e/b and the torque ripples varying with e/b, where s2 is a variation curve of the electromagnetic torque, and s1 is a variation curve of the torque ripple. It can be seen from FIG. 14 that, the minimum torque ripple is reached at 0.91, and the maximum electromagnetic torque is reached at 0.96.

The thickness of the permanent magnets 8 in the magnetization direction is t; the depth d of the first air slot 11 is a radial distance from a position of the first air slots 11, which is nearest to the center of the rotary axis of the rotor, to the outer periphery of the rotor core 9. The position of the first air slot 11 may significantly affect the cross-axial inductance, and the cross-axial inductance will be rapidly decreased when the value of d is larger, and a smaller cross-axial inductance will cause larger torque ripples, therefore, the value of d needs to be designed reasonably. Preferably, in the present embodiment, 0.5t≤d≤2t.

Figure 15:
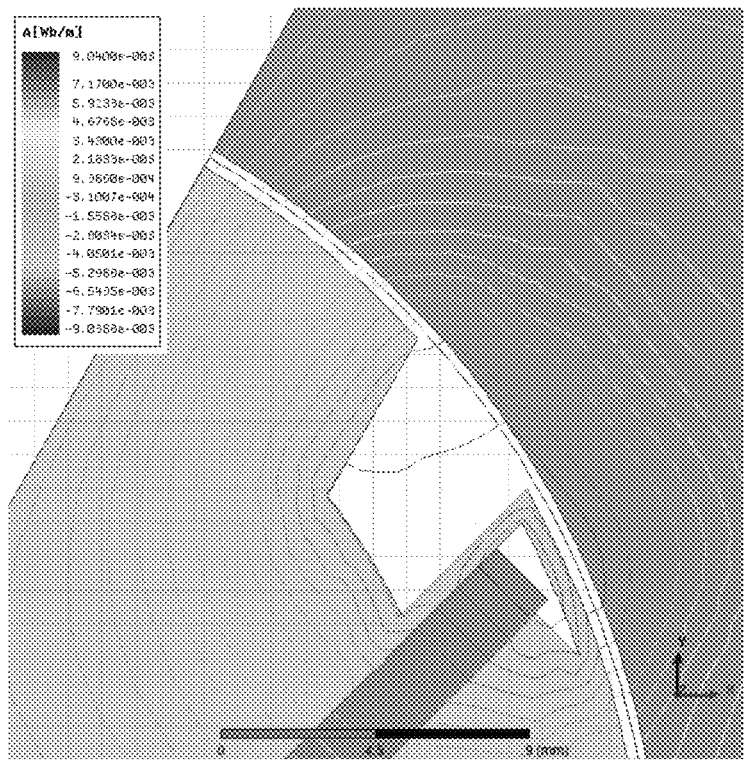
FIGS. 15 and 16 are diagrams respectively illustrating a distribution of magnetic lines in an alternating pole corresponding to different values of d.
Figure 16:
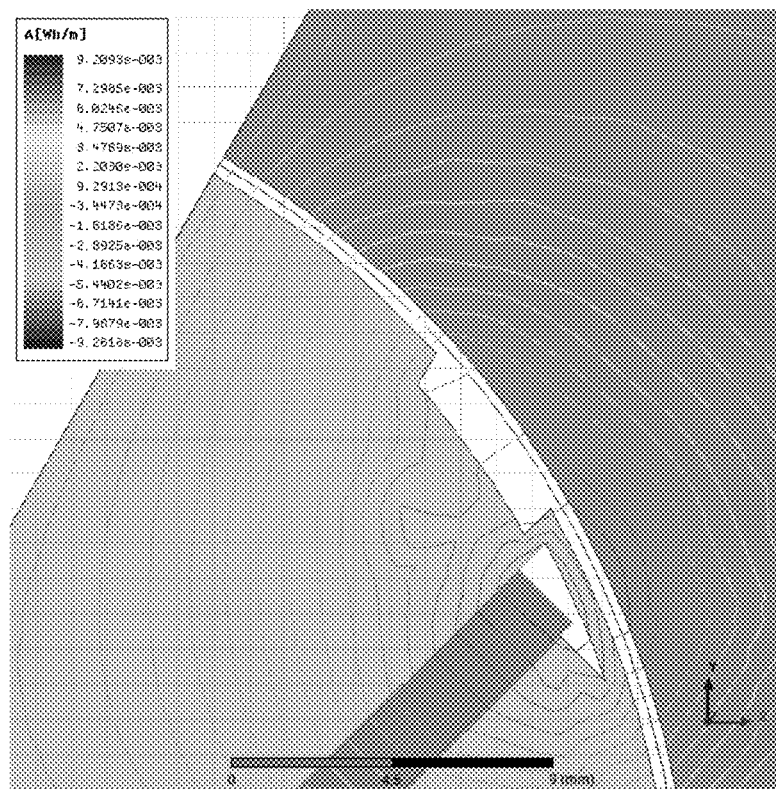

The first air slots 11 having an appropriate depth d are beneficial for the alternating pole 4 adjusting the magnetic beams, to form a larger magnetic line density in the air gap, thereby improving the output of the motor. FIG. 15 shows a distribution of magnetic lines in the alternating pole when d=1.8t. The alternating pole can collect the magnetic lines in the magnetic pole well, and only a few magnetic lines pass through the air gap and reach the stator component. FIG. 16 shows a distribution of magnetic lines near the alternating poles when d=0.45t, and it can be seen that the magnetic lines which pass through the air gap rather than through the surface of the magnetic pole to reach the surface of the stator component are obviously increased, and it is difficult to form a higher flux density in the air gap corresponding to the alternating pole, resulting in insufficient output of the motor.

Figure 17:
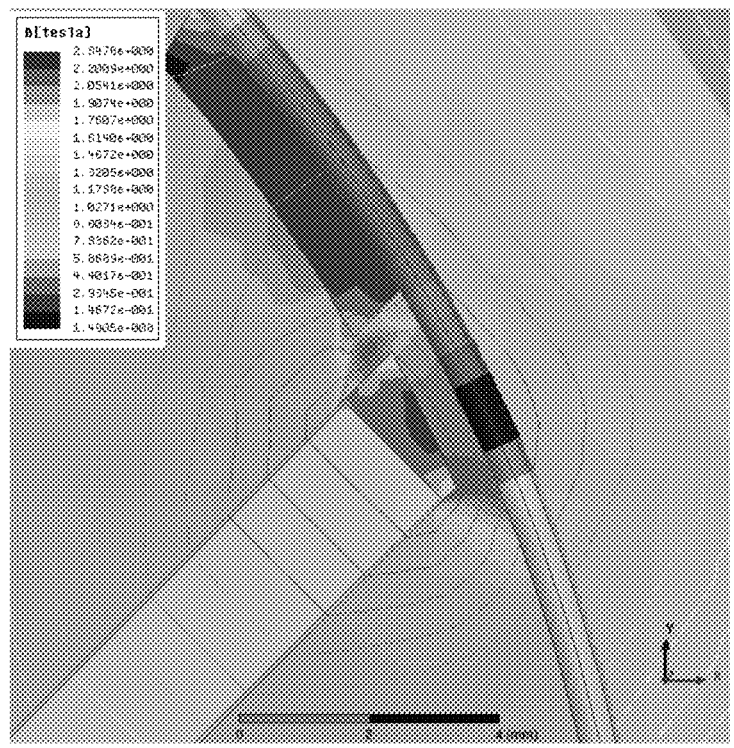
FIGS. 17 and 18 are diagrams respectively illustrating a distribution of magnetic flux densities corresponding to different values of d.
Figure 18:
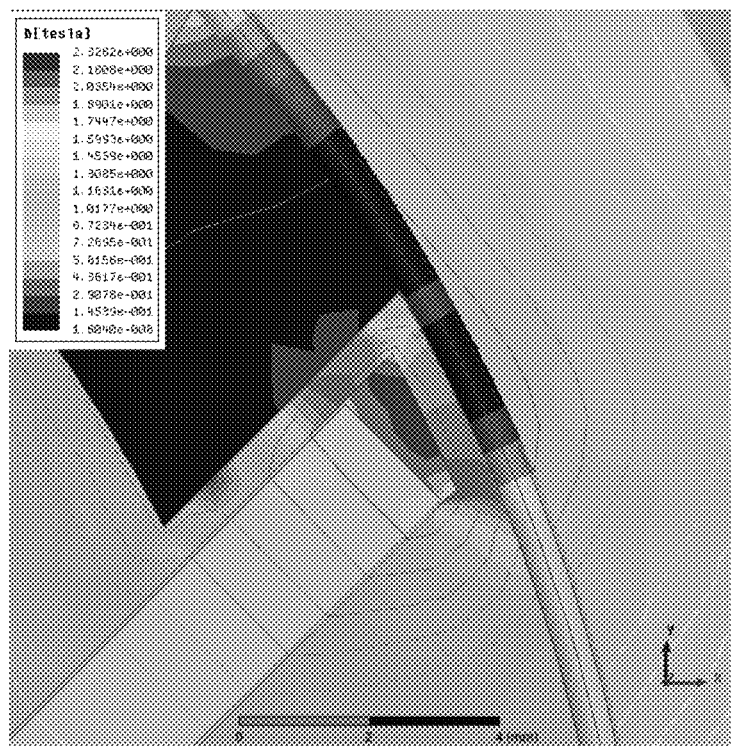

On the other hand, there is a magnetic flux leakage at the ends of the permanent magnet, which can be perfectly weakened by adjusting the value of d. FIG. 17 shows a distribution of magnetic lines at the end of the permanent magnet when d=0.45t. It can be seen that more magnetic lines are closed at the end of the permanent magnet, not passing through the core of the stator component, and this portion of magnetic flux is the end magnetic flux leakage, which cannot produce effective electromagnetic torque. In FIG. 18, when d=1.8t, a magnetic bridge structure with a smaller width, which is formed by soft magnetic material when the air slots adjacent to the surface of the permanent magnet extend towards the center of the rotor, and the flux density is easy to be saturated, thereby effectively preventing the magnetic lines at the end of the permanent magnet from being closed.

In some embodiments, the second air slot 12 has a width w1 in the radial direction, and the distance between an edge of the second air slot 12, which is adjacent to the mounting slot 10, and the outer periphery of the rotor core 9 is w2, where 0.9≤w1/w2≤1.1. If w1 is too small, the magnetic flux leakage will increase. If w1 is too large, the magnetic resistance of the air gap corresponding to the permanent magnet pole, which will affect the output of the motor. By associating w1 with w2 and limiting the proportional relationship therebetween, the magnetic flux leakage can be effectively reduced, and the output of the motor can be ensured.

In some embodiments, an angle c is formed by lines respectively connected between two outermost ends of the permanent magnet 8 in one mounting slot 10 and the center of the rotor, where the two outermost ends of the permanent magnet 8 are respectively adjacent to one side of the corresponding second air slot 12, where $0.7 \le e/c \le 1$. Study proves that, although there is an optimum ratio between e and b, if e is too small, a severe magnetic saturation may occur in the air gap corresponding to the permanent magnet pole, and thereby the output of the motor is reduced. Therefore, the angle e needs to be defined by angle c, such that e can better meet the requirements.

In some embodiments, the second air slot 12 is filled with non-magnetic material such as resin, which can increase the strength of the laminated sheets and limit the movement of the permanent magnets.

In some embodiments, the number of permanent magnets 8 in each of the mounting slots 10 is greater than or equal to 1, and the number of permanent magnets 8 in each of the mounting slots 10 can be 1, 2, 3, etc.

In some embodiments, the permanent magnet 8 contains rare earth elements. Study proves that the magnets with rare earth elements have high residual magnetization and coercivity, therefore, compared with the conventional motor, the structure of the consequent-pole permanent magnet motor generally has the problems of insufficient output and insufficient anti-demagnetization capability, the magnet with rare earth elements is more suitable for the consequent-pole permanent magnet motor.

Figure 8:
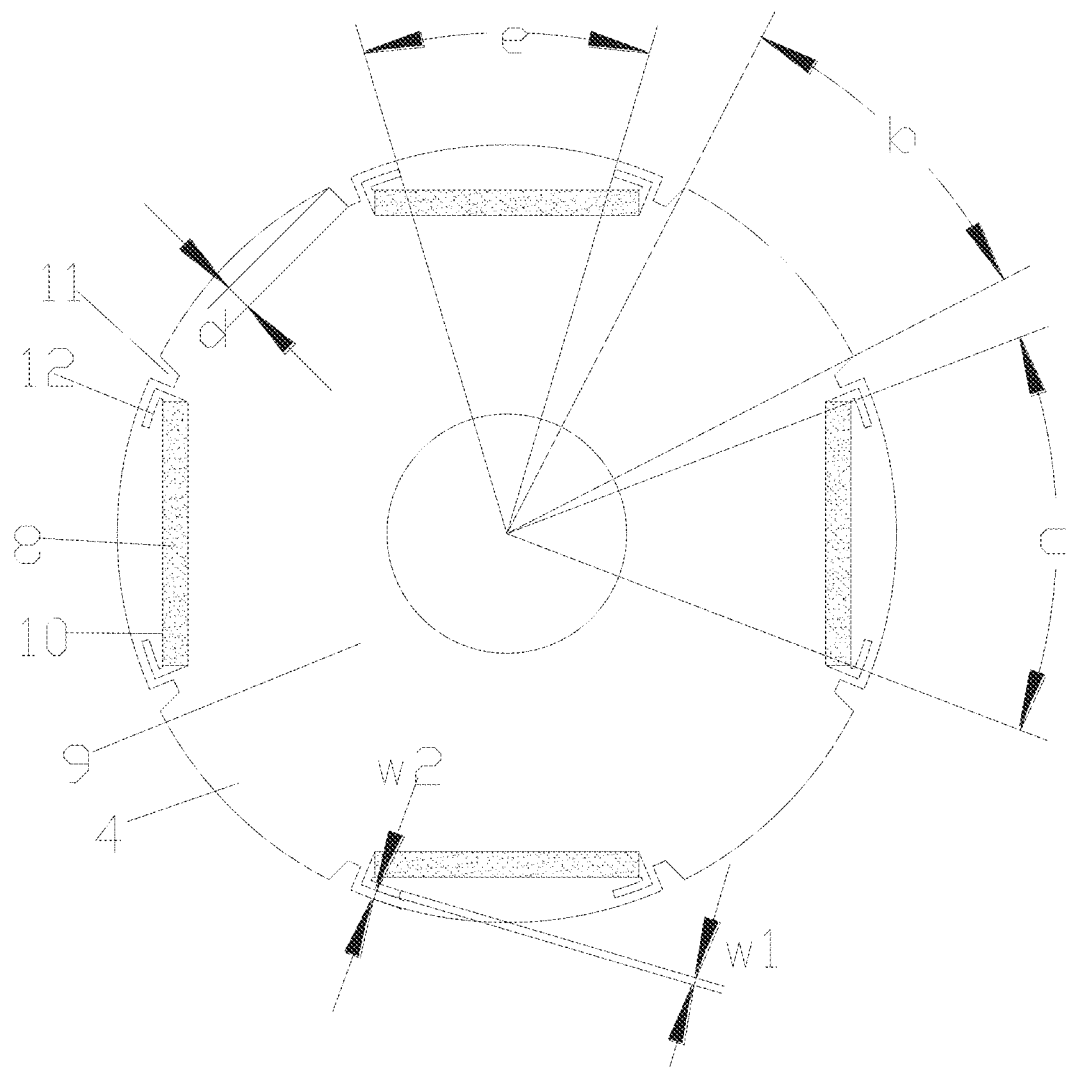
FIG. 8 is a structural diagram of a first embodiment of the rotor component of the present invention.

With reference to FIG. 8, according to the first embodiment of the present invention, the first air slot 11 extends inwards from the outer periphery of the rotor core 9, and the second air slot 12 is disposed at an inner side of the outer periphery of the rotor core 9 and is in communication with an adjacent end of the mounting slot 10. An interval is formed between the first air slot 11 and the second air slot 12. In the present embodiment, the mounting slot 10 is bar-shaped, and correspondingly, the permanent magnet 8 is bar-shaped in the whole. This structure can significantly reduce the usage of the permanent magnets, reduce the cost of the motor and has large output and small torque ripples.

Figure 9:
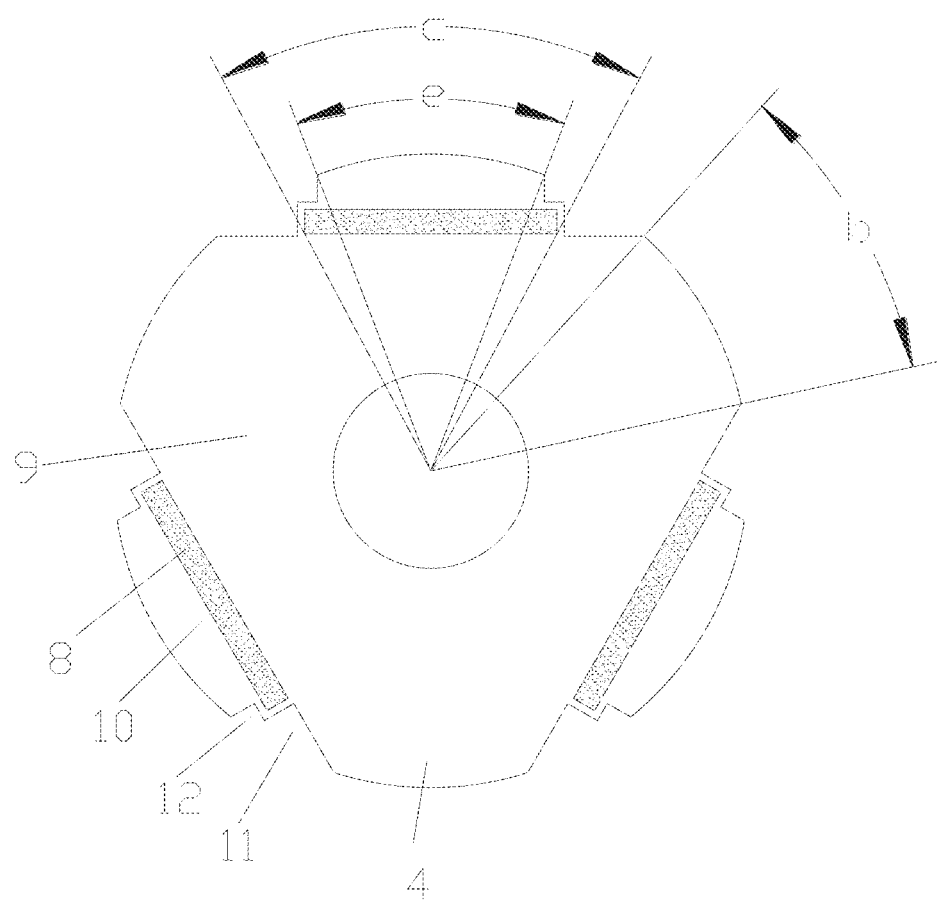
FIG. 9 is a structural diagram of a second embodiment of the rotor component of the present invention.

With reference to FIG. 9, according to the second embodiment of the present invention, the first air slot 11 extends inward from the outer periphery of the rotor core 9. The second air slot 12 extends inward from the outer periphery of the rotor core 9. The second air slot 12 is in communication with the first air slot 11 and is spaced apart from the mounting slot 10. In the present embodiment, the second air slots 12 and the first air slot 11 disposed at the same end of the permanent magnets are communicated to form a whole, and an isolation magnetic bridge is formed between each end of the permanent magnet 8 and the corresponding second air slot 12, and the length of the air gap corresponding to the permanent magnetic pole can be adjusted. The structure of the rotor component is simpler, which is beneficial to simplify the machining process for the rotor component.

Figure 10:
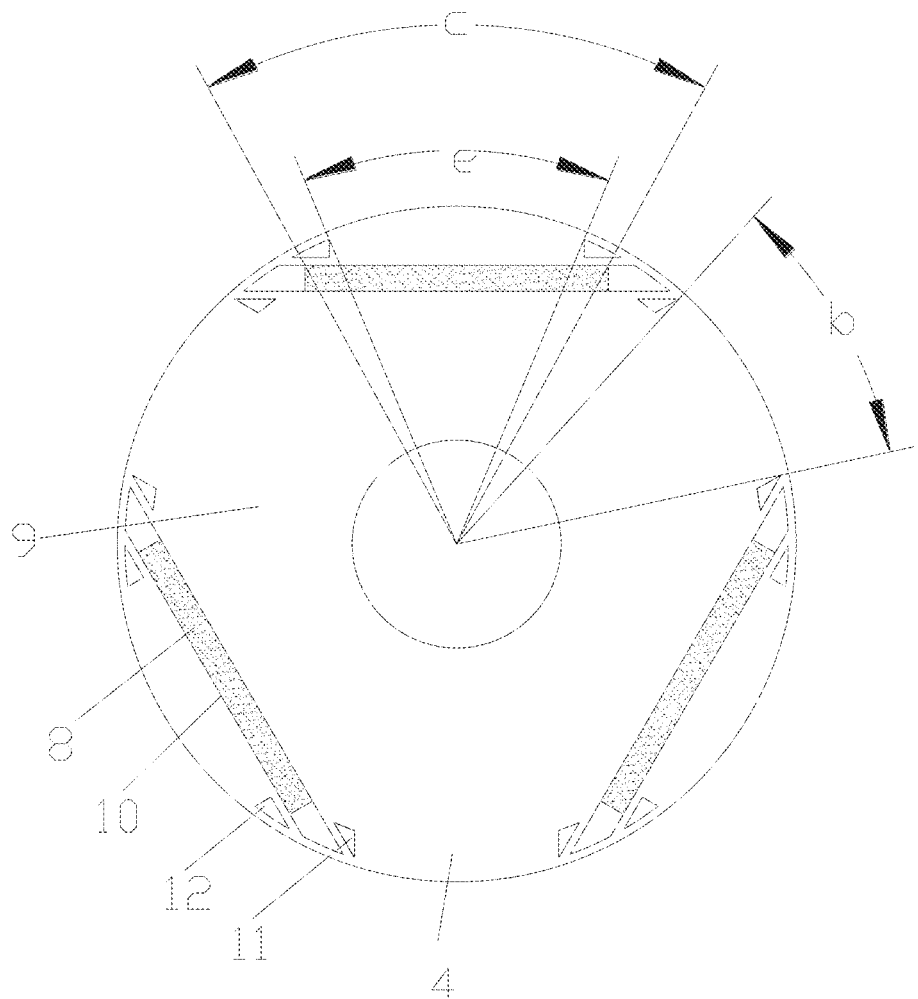
FIG. 10 is a structural diagram of a third embodiment of the rotor component of the present invention.

With reference to FIG. 10, according to the third embodiment of the present invention, the first air slots 11 are located at an inner side of the outer periphery of the rotor core 9, and the second air slots 12 are located at an inner side of the outer periphery of the rotor core 9, and each of the second air slots 12 is spaced apart from the mounting slot 10. In the present embodiment, the second air slots 12 at two ends of the permanent magnet 8 are not in communication with the mounting slot 10 of the permanent magnet 8, but are respectively connected with the permanent magnet 8 by a strengthening rib therebetween. The first air slots 11 between the permanent magnet pole and the alternating pole is also disposed at the inner side of the outer periphery of the rotor and is not extended to the outer periphery of the rotor. According to the rotor component of the present embodiment, the mechanical strength of the rotor can be effectively enhanced, thereby reducing the sharp change of the magnetic flux density of the air gap at the outer periphery of the rotor.

Figure 11:
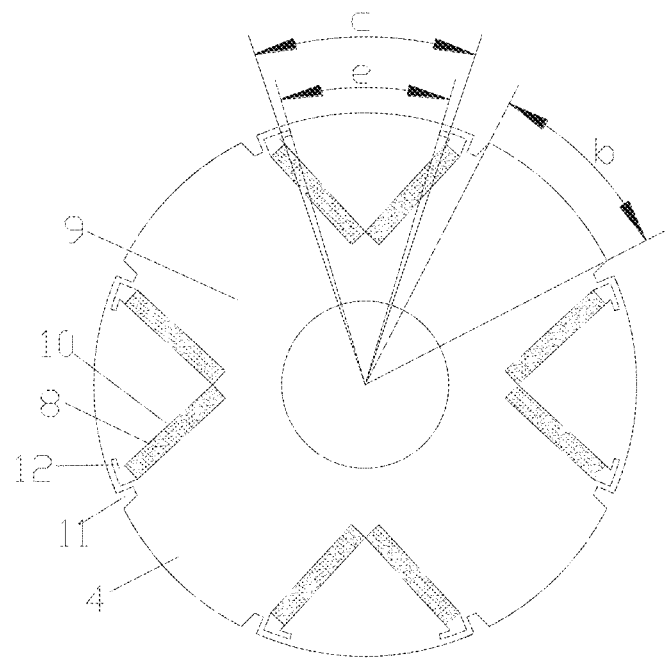
FIG. 11 is a structural diagram of a fourth embodiment of the rotor component of the present invention.
Figure 12:
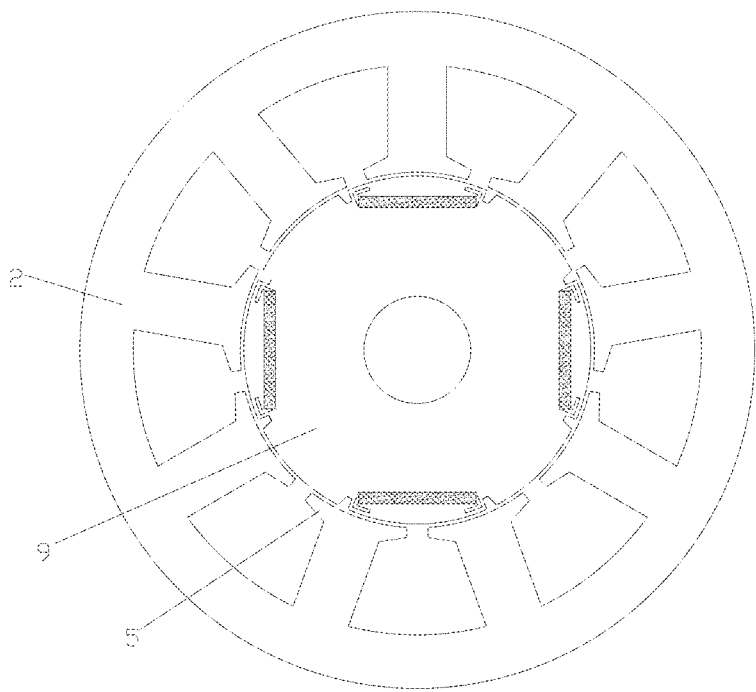
FIG. 12 is a structural diagram of a permanent magnet motor according to an embodiment of the present invention.

With reference to FIG. 11, the fourth embodiment of the present invention is basically the same as the first embodiment, except that in the fourth embodiment, the mounting slot 10 is V-shaped, and correspondingly, the mounting form of the permanent magnet 8 is V-shaped. When the mounting form of the V-shaped permanent magnet 8 is utilized, more space is provided for mounting the permanent magnets, and the anti-demagnetization capability can be improved.

The above-mentioned mounting forms for the permanent magnets as well as the structural forms of the first air slot 11 and the second air slot 12 can be combined as required.

Those skilled in the art will readily understand that, the above-mentioned beneficial embodiments can be freely combined and added together if no conflicts are involved.

What described above are some embodiments of the present invention, and they are not intended to limit the scope of the present invention. Any modifications, equivalent replacement and improvement made without departing from the spirits and principles of the present invention are within the scope of the present invention. What described above are some embodiments of the present invention. It should be noted that, for those skilled in the art, various improvement and transformation made without departing from the technology principles of the present invention are within the scope of the present invention.

What is claimed is:

1. A permanent magnet motor, comprising a rotor component and a stator component; wherein:

the rotor component comprises alternating poles and permanent magnet poles alternately arranged in a circumferential direction; the stator component comprises stator teeth portions arranged on an inner circumferential side of the stator component and spaced apart in a circumferential direction; a first air gap is formed between an inner circumferential surface of each of the stator teeth portions and an outer circumferential surface of a corresponding permanent magnet pole; a second air gap is formed between the inner circumferential surface of each of the stator teeth portions and an outer circumferential surface of a corresponding alternating pole; an average thickness of the first air gap is $\delta 1$; an average thickness of the second air gap is $\delta 2$, wherein $0.4 \le \delta 2/\delta 1 \le 0.9$;

the rotor component comprises a rotor core; a plurality of mounting slots are arranged on the rotor core and spaced apart in a circumferential direction; permanent magnets are arranged in the mounting slots; polarities of the permanent magnets facing an outer periphery of the rotor core are the same; adjacent mounting slots are spaced apart by soft magnetic material; for each of the plurality of mounting slots; first air slots are respectively arranged between one of two ends of the mounting slot and soft magnetic material adjacent thereto in a circumferential direction; two second air slots are arranged at one side of the mounting slot, the one side of the mounting slot being adjacent to the outer periphery of the rotor core; one of the second air slots is arranged at a first end of the two ends of the mounting slot, and another second air slot is arranged at a second end of the two ends of the mounting slot; and the two second air slots extend in opposite directions.

2. The permanent magnet motor of claim 1, wherein, a thickness of a permanent magnet of the permanent magnet poles is t, wherein $t/(\delta2+\delta1)\geq1.5$.

3. The permanent magnet motor of claim 1, wherein, an outer circumference of the permanent magnet pole has a first arc; an outer circumference of the alternating poles has a second arc; the first arc and the second arc are concentric; a radius of curvature of the first arc is r1, and a radius of curvature of the second arc is r2, wherein r1<r2.

4. The permanent magnet motor of claim 1, wherein, an outer circumference of the permanent magnet pole is a first arc; an outer circumference of the alternating pole is a second arc; the first arc and/or the second arc is eccentric relative to a center of a rotary axis of the rotor component; the first arc and the second arc are not concentric; and a thickness of the first air gap and/or a thickness of the second air gap is uneven.

5. The permanent magnet motor of claim 1, wherein, an outer circumference of the permanent magnet pole is step-shaped; a height of the step is reduced from a center of the outer circumference of the permanent magnet pole to both sides of the outer circumference of the permanent magnet pole; and/or an outer circumference of the alternating poles is step-shaped, and a height of the step is reduced from a center of the outer circumference of the alternating pole to both sides of the outer circumference of the alternating pole.

6. The permanent magnet motor of claim 5, wherein, a top of the step is arc-shaped.

7. The permanent magnet motor of claim 1, wherein, for each of the stator teeth portions: a tangent of an inner circle of the stator tooth portion is formed at an intersection point of an extension line of a side surface of each alternating pole and the inner circle of the stator tooth portion, and an angle α is formed between the tangent and the side surface of each alternating pole, and 55°<α<90°.

8. The permanent magnet motor of claim 1, wherein, at least one segment of the inner circumferential surface of each of the stator teeth portions, the at least one segment being adjacent to the rotor component, is an arc having a same center.

9. The permanent magnet motor of claim 1, wherein, the rotor component comprises a rotor core and permanent magnets embedded in the rotor core; and each of the permanent magnets is bar-shaped or V-shaped.

10. The permanent magnet motor of claim 1, wherein, the first air slots extend inwards from the outer periphery of the rotor core; or the first air slots are disposed at an inner side of the outer periphery of the rotor core.

11. The permanent magnet motor of claim 1, wherein, the second air slots extend inward from the outer periphery of the rotor core; each of the second air slots is in communication with a corresponding first air slot and is spaced apart from the mounting slot; or each of the second air slots is located at an inner side of the outer periphery of the rotor core and is in communication with an end of the mounting slot; or each of the second air slots is located at an inner side of the outer periphery of the rotor core and is spaced apart from the mounting slot.

12. The permanent magnet motor of claim 1, wherein, the alternating pole is formed by soft magnetic material between two adjacent mounting slots; a minimum angle b is formed by lines which are respectively connected between a respective slot of the two first air slots disposed at two circumferential ends of one of the alternating poles and a center of the rotor core; and a minimum angle e is formed by lines which are respectively connected between a respective slot of the two second air slots corresponding to one mounting slot and the center of the rotor core, wherein $0.8\leq b/e\leq1.1$.

13. The permanent magnet motor of claim 12, wherein, an angle c is formed by lines which are respectively connected between a respective end of two outermost ends of each of the permanent magnets in one mounting slot and the center of the rotor, wherein, the two outermost ends of the permanent magnet are respectively adjacent to one side of a respective second air slot of the corresponding second air slots, wherein $0.7\leq e/c\leq1$.

14. The permanent magnet motor of claim 1, wherein, a thickness of the permanent magnet in a magnetization direction is t, and a depth d of a first air slot of the first air slots is a radial distance from a position of the first air slot, which is nearest to a center of a rotary axis of the rotor, to the outer periphery of the rotor core, wherein $0.5t\leq d\leq2t$.

15. The permanent magnet motor of claim 1, wherein, a second air slot of the second air slots has a width w1 in a radial direction; and a distance between an edge of the second air slot, which is adjacent to the mounting slot, and the outer periphery of the rotor core is w2, wherein $0.9\leq w1/w2\leq1.1$.

16. The permanent magnet motor of claim 1, wherein, the second air slots are filled with non-magnetic material.

17. The permanent magnet motor of claim 1, wherein, more than one permanent magnet is arranged in each mounting slot.

18. The permanent magnet motor of claim 1, wherein, the permanent magnet contains rare earth elements.

* * * * *